United States Patent [19]
Loza et al.

[11] Patent Number: 6,136,898
[45] Date of Patent: Oct. 24, 2000

[54] UNBLOWN ETHYLENE-VINYL ACETATE COPOLYMER TREATED ASPHALT AND ITS METHOD OF PREPARATION

[75] Inventors: Roman Loza, Dublin; Laurence G. Dammann, Powell, both of Ohio; Roger E. Hayner, Hebron; Patricia K. Doolin, Ashland, both of Ky.

[73] Assignees: Marathon Ashland Petroleum LLC; Ashland Inc.

[21] Appl. No.: 09/333,430

[22] Filed: Jun. 15, 1999

[51] Int. Cl.[7] ............................................. C08L 95/00
[52] U.S. Cl. ................................. 524/69; 524/59
[58] Field of Search ............................ 524/69, 59

[56] References Cited

U.S. PATENT DOCUMENTS

| | | | |
|---|---|---|---|
| 4,454,269 | 6/1984 | Goodrich | 524/69 |
| 5,070,123 | 12/1991 | Moran | 524/69 |
| 5,095,055 | 3/1992 | Moran | 524/69 |
| 5,990,206 | 11/1999 | Tanaka et al. | 524/69 |

FOREIGN PATENT DOCUMENTS

| 0 157 210 | 10/1985 | European Pat. Off. | 524/69 |
|---|---|---|---|

*Primary Examiner*—Peter A. Szekely
*Attorney, Agent, or Firm*—Laurence P. Hobbes; Richard . Stone

[57] ABSTRACT

A method is provided for improving high temperature performance grade properties of unblown asphalt by i) heating an asphalt cement to 200° F. to 500° F. (93° C. to 260° C.), ii) adding 0.1 wt. % to 10 wt. % ethylene-vinyl acetate copolymer based on weight of said asphalt cement to the heated asphalt cement, iii) adding 0.05 wt. % to 1.0 wt. % phosphorus-containing acid, e.g., polyphosphoric acid, based on weight of said asphalt cement and iv) mixing the resulting blend, thereby providing an unblown asphalt composition of greater useful temperature index (UTI). The invention further relates to asphalt compositions thus made and paving compositions containing these asphalt compositions.

15 Claims, No Drawings

UNBLOWN ETHYLENE-VINYL ACETATE COPOLYMER TREATED ASPHALT AND ITS METHOD OF PREPARATION

BACKGROUND OF THE INVENTION

I Field of the Invention

The invention relates to unblown polymer modified asphalt compositions that exhibit improved performance grade specifications for high temperature properties. The invention further relates to a method of improving ethylene-vinyl acetate copolymer efficiency in polymer-modified asphalts.

II. Description of the Prior Art

It is known that adding polymer to asphalt improves the high temperature performance grade (PG) of paving asphalt cements as defined under the test methods established by the Strategic Highway Research Program (SHRP). Commonly used polymers include ethylene-vinyl acetate (EVA) copolymers and styrene-butadiene-styrene triblock (SBS) copolymer. These polymers are blended into the asphalt using high shear mix conditions to ensure proper dispersion of the polymer. Of the polymers used, SBS polymers are preferred because of their compatibility with a large number of asphalts. In addition, they can be crosslinked using vulcanizing agents such as sulfur.

Blending polymers with paving asphalts produces a change in the viscoelastic behavior of the asphalt. The change in viscoelastic properties is attributed to an increase in viscosity and elasticity and the formation of a network structure. The change in viscoelastic properties is related to the amount of polymer added, with network formation occurring above some finite polymer concentration. The amount of polymer needed can be reduced by adding a vulcanizing (crosslinking) agent such as sulfur. The crosslinking reaction allows the network structure to form at a lower polymer concentration. This improves polymer efficiency, reducing the amount of polymer needed to make a specific grade of asphalt cement. Unsaturated polymers such as SBS copolymers are easily crosslinked, but EVA copolymers which lack the requisite unsaturation are not.

Crosslinking enhances the efficiency of the polymer so that a lower concentration can give the desired improvement in the SHRP high temperature performance grade. The crosslinking is believed to occur through the reaction of sulfur with residual double bonds of the butadiene portion of the polymer. Unfortunately, the unsaturation in the SBS copolymer makes it more susceptible to degradation by atmospheric oxygen. EVA copolymers do not contain residual unsaturation and are not so easily degraded; however, the lack of unsaturation makes it difficult to crosslink these polymers.

U.S. Pat. No. 4,454,269 to Goodrich teaches the use of phosphoric acid and $P_2O_5$ as a catalyst for air-blowing of asphalt/EVA copolymer blends. The purpose of the air blowing step is to improve the compatibility of the EVA copolymer. Simply blending the EVA copolymer into an airblown asphalt leads to incompatibility of the polymer. In contrast, the present invention relates to improving high temperature properties for unblown asphalts.

SUMMARY OF THE INVENTION

I. General Statement of the Invention

In one aspect, the present invention relates to a method for improving high temperature performance grade properties of unblown asphalt which comprises i) heating an asphalt cement to 200° F. to 500° F. (93° C. to 260° C.), ii) adding 0.1 wt. % to 10 wt. % ethylene-vinyl acetate copolymer based on weight of said asphalt cement, iii) adding a useful temperature index (UTI) improving amount of phosphorus-containing acid, and iv) mixing the resulting blend, thereby providing an unblown asphalt having a greater useful temperature index (UTI) than a corresponding blend to which no phosphorus-containing acid is added.

In another aspect, the invention relates to an unblown asphalt composition comprising a mixture containing a) at least 80 wt. % of an asphalt cement, b) 0.1 wt. % to 10 wt. % ethylene-vinyl acetate copolymer, and c) polyphosphoric acid added in an amount sufficient to improve useful temperature index (UTI) relative to a corresponding mixture free of said polyphosphoric acid.

In still another aspect, the invention relates to a method for improving the effectiveness of ethylene-vinyl acetate copolymer modifier in unblown asphalt compositions containing a) at least 80 wt. % asphalt cement and b) 0.1 wt. % to 10 wt. % ethylene-vinyl acetate copolymer by adding a useful temperature index (UTI) improving amount of polyphosphoric acid.

In yet another aspect, the invention relates to a pavement composition comprising an aggregate or aggregate material and from 1.0 wt. % to 10.0 wt. % of an unblown paving asphalt composition containing a) at least 80 wt. % of a paving asphalt cement, b) 0.1 wt. % to 10 wt. % ethylene-vinyl acetate copolymer, and c) phosphorus-containing acid added in an amount sufficient to improve useful temperature index (UTI) relative to a corresponding mixture free of said phosphorus-containing acid.

Although the mechanism of the present invention is not known, it can be postulated that the addition of phosphorus-containing acid, e.g., polyphosphoric acid, to an EVA-containing asphalt mixture causes an acid induced elimination of the acetate group, thereby creating unsaturated sites having potential for crosslinking reactions. Alternatively, the acid groups in the asphalt could transesterify, forming crosslinks within the asphalt. The present invention is of particular utility in applications where the presence of sulfur is to be avoided or minimized, inasmuch as the crosslinking associated with the present invention can occur in sulfur's absence. The use of sulfur has some major drawbacks. In particular, adding sulfur to asphalt produces hydrogen sulfide gas as a byproduct. Hydrogen sulfide is extremely poisonous and must be properly removed and treated. This requires the installation and maintenance of special equipment which increases capital and operating costs.

The present invention can be used to prepare a wide variety of asphalt materials including asphalt pavement compositions, asphalt emulsions, modified asphalt emulsions, roofing asphalt compositions, coatings, sealants, adhesives, and sound deadeners.

ASPHALT CEMENT (PETROLEUM BITUMENS)

The asphalt composition of the present invention contains an unblown natural or synthetic asphalt cement component. Such asphalt cement component can have a viscosity of 100 to 5000 poise at 60° C. (140° F.), preferably 250 to 4000 poise, e.g., 2000 poise for AC20 asphalt cement, and 500 poise for AC5 asphalt cement. The asphalt cement component is added in amounts sufficient to provide the resulting asphalt composition with the desired viscosity for the intended application, e.g., 2000 poise at 60° C. (140° F.) for various applications, e.g., paving applications. For Performance Graded Applications, the asphalt compositions can have a G*/sin delta value in excess of 1.0 kPa at temperatures ranging from 46° C. to 82° C., preferably 52° C. to 76° C. Generally, the asphalt compositions of the present invention contain at least 80 wt. %, preferably from 80 wt. % to 98.9 wt. %, e.g., 90 wt. % to 95 wt. %, of such asphalt cement component. The asphalt cement component of reduced viscosity can be obtained from any suitable source, e.g., atmospheric distillation bottoms or vacuum tower bottoms. The asphalt used in the present invention can be a natural asphalt or a synthetic asphalt.

Natural asphalt can be obtained from crude petroleum, bituminous schists, heavy oils, bituminous sands or coal. Natural asphalt can be, for example: a) the heaviest fraction obtained by direct distillation of crude petroleum at atmospheric or reduced pressure; b) the heavy phase obtained by solvent-deasphalting a heavy fraction as obtained under a); c) the product of oxidation, in the presence or absence of a catalyst, of a heavy fraction as obtained under a) or of a heavy phase as obtained under b); d) the product of oxidation, in the presence or absence of a catalyst, of a blend of a heavy fraction as obtained under a) or of a heavy phase as obtained under b) and a distillate, or an aromatic extract obtained in the dearomatization of lubricating oils, or a deasphalting pitch; e) a blend of an oxidized product obtained as under c) and d) or of a hard phase, and a distillate, or an aromatic extract obtained in the dearomatization of lubricating oils, or a deasphalting pitch, or a heavy fraction as obtained under a) or a heavy phase as obtained under b); f) a visbroken base, alone or in admixture with one or more of the above said products; g) one of the products as obtained under a) to f) in admixture with a distillate, or an aromatic extract obtained in the dearomatization of lubricating oils, or a deasphalting pitch, or a heavy aromatic fraction (catalytic slurry) obtained from a catalytic cracking process.

Suitable synthetic asphalts have properties similar to those of the above-described natural asphalts, for example, clear synthetic binders that can be colored by addition of pigments. Such asphalts can consist, for example, of petroleum resins or indeno-coumarone resins blended with aromatic and/or paraffinic hydrocarbons. Such petroleum resins can be prepared by polymerization of unsaturated hydrocarbons present in unsaturated petroleum fractions, such as the fractions obtained by thermal or steam cracking or by pyrolysis. The indene-coumarone resins are generally obtained from coal tars.

As used herein, the terms "asphalt composition," "asphalt cement" or "asphalt binder" are understood to refer to any of a variety of organic materials, solid or semi-solid at room temperature, which gradually liquefy when heated, and in which the predominate constituents are naturally occurring bitumens, e.g., Trinidad Lake, or residues commonly obtained in petroleum, synthetic petroleum, or shale oil refining, or from coal tar or the like. A "paving asphalt composition," "paving asphalt cement," or "paving asphalt binder," accordingly is an asphalt composition or asphalt cement having characteristics which dispose the composition to use as a paving material, as contrasted, for example, with an asphalt composition suited for use as a roofing material. "Roofing asphalts," for example, usually have a higher softening point, and are thus more resistant to flow from heat on roofs. Paving asphalt mixtures may be formed and applied in a variety of ways, as well understood by those skilled in the art. For example, the paving asphalt composition and the aggregate can be mixed and applied at elevated temperatures at the fluid state of the paving asphalt composition to form the pavement or road surface.

POLYMER ADDITIVES

The polymers finding particular use in this application are ethylene-vinyl-acetate (EVA) copolymers. The preferred copolymer is tradenamed Polybilt 152™ and is available from Exxon Chemical Company, Houston, Tex. Another suitable EVA copolymer is trade named ELVAX®40P and manufactured by the E. I. DuPont de Nemours Corporation of Wilmington, Del. EVA describes a family of thermoplastic polymers ordinarily ranging from 5 to 50 percent by weight of vinyl acetate incorporated into an ethylene chain. The EVA ELVAX®40P contains approximately 39–42 weight percent of vinyl acetate and has a melt index of 48–66 g/10 minutes g/10 minutes (ASTM D1238). It is a medium low viscosity resin showing excellent solubility in many organic solvents and is ordinarily used to improve flexibility and adhesion of lacquers and inks and in pressure-sensitive hot melt or solvent-applied adhesives. The preferred amount of EVA introduced into the asphalt ranges from about 0.1 wt. % to 10 wt. %, preferably 2 wt. % to 5 wt. %, for example 3 wt. % based on asphalt cement content.

Optionally, compositions of the present invention may contain other polymers in addition to ethylene-vinyl acetate copolymer. Such polymers include ethylene butylacrylate copolymer, ethylene butylacrylate glycidyl methacrylate copolymer such as those known as ELVALOY® AM, available from E. I. DuPont. Other suitable polymers include, styrene-butadiene (SB) diblocks, styrene-isoprene-styrene (SIS) triblocks, and styrene-butadienestyrene (SBS) triblocks, such as those taught in U.S. Pat. No. 3,238,173 to Bailey (assigned Shell); U.S. Pat. No. 4,145,322 to Maldonado et al. (Elf) (block copolymer with an average molecular weight between 30,000 and 300,000 having the theoretical formula $S_x$–$B_y$ in which S corresponds to styrene structure groups, and B corresponds to conjugated diene structure groups and x and y are integers); U.S. Pat. No. 4,154,710 to Maldonado et al. (Elf) (thermoplastic elastomer having a molecular weight between 100,000 and 2,000,000, e.g. polyisobutenes, styrene-butadiene rubber (SBR), polychloroprene, isobutene-isoprene copolymers, halogenated or non-halogenated, ethylene-propylene-diene terpolymers (EPDM), ethylene-propylene copolymers (EPR), ethylene-cyclopentadiene copolymers, polybutadienes, and polynorbornenes); U.S. Pat. No. 4,162,999 to Bohemen (British Petroleum); U.S. Pat. No. 4,237,052 to Fitoussi et al. (Elf) (dihalopolybutadiene polymer and tri-block copolymer with a linear or cyclic structure of a molecular weight within the range of 100,000 and 300,000); U.S. Pat. No. 4,242,246 to Maldonado (Elf) (polystyrene-polydiene disequenced, multisequenced, or statistical copolymer); U.S. Pat. No. 4,330,449 to Maldonado et al. (Elf) (polyblock copolymer of a styrene-carboxylated conjugated diene having a mean molecular weight of 30,000 to 300,000); U.S. Pat. No. 4,554,313 to Hagenbach (Elf) (styrene-conjugated diene copolymer); U.S. Pat. No. 4,567,222 to Hagenbach (Elf); U.S. Pat. No. 4,585,816 to Vitkuske (Dow Chemical); U.S. Pat. No. 5,023,282 to Neubert (GenCorp); U.S. Pat. No. 5,039,342 to Jelling (National Patent Development); U.S. Pat. No. 5,118,733 to Gelles (Shell); and U.S. Pat. No. 5,120,777 to Chaverot (Elf); (diene/vinyl aromatic block copolymers, e.g. methylstyrene, tertiary butyl styrene, etc.). It is especially preferred to add styrene-butadiene (SB) diblock copolymers or styrene-butadiene-styrene (SBS) tri-block copolymers to the blended asphalt products of the present invention. The preferred amount of the additional polymer introduced into the asphalt ranges from about 0.5 wt. % to 10 wt. %, preferably 2 wt. % to 5 wt. %, for example, 3 wt. % to 4 wt. % based on asphalt cement content.

PHOSPHORUS-CONTAINING ACIDS

Phosphorus-containing acids suited to use in the present invention include $P_2O_3$, $P_2O_5$, $P_4O_6$, $P_4O_7$, phosphorous acid, phosphoric acid, and polyphosphoric acid (phospholeum). The term "phosphorus-containing acids" includes precursors of phosphorus acids, e.g., oxides of phosphorus which can form acids by reacting with water derived from various sources, e.g., asphalt dehydration reactions.

DESCRIPTION OF THE PREFERRED EMBODIMENTS

As a result of the 1987 Intermodal Surface Transportation Efficiency Act (ISTEA), a $150 million research study was commissioned in which $50 million was spent towards asphalt research for improving asphalt pavements. As a product of that research which was concluded in 1992, the Strategic Highway Research Program (SHRP) produced what is now known as the Superpave® Performance Graded Binder Specification in which asphaltic binders are graded or characterized according to their relative performance in resistance to rutting, shoving or deformation at high temperatures, fatigue at intermediate temperatures, and thermal cracking resistance at low temperatures. Asphalts which normally would be graded either under the penetration or viscosity specifications will now be graded as PG or Performance Graded binders. As such, their designation will be representative of their resistance at both high and low temperature, indicating their useful temperature range as a PG AA–BB where AA=high temperature resistance in degrees Celsius and BB is low temperature cracking resistance in minus degrees Celsius, i.e., PG 64-22 would prevent rutting up to 64° C. (147° F.) and low temperature cracking to a minus 22° C. (−7.6° F.). Useful temperature index (UTI) is the difference between AA and BB such that a PG 64-22 material would have a UTI of 64-(−22), i.e., 86.

Areas of high loading or slow or standing traffic as well as areas where temperature extremes can be experienced in excess of 86° C. (155° F.) between high and low temperature levels will require the use of modifiers to obtain the increased useful temperature range. As a result, it has been common to add or start with softer asphalts to reach low temperature properties while adding modifiers such as polymers to achieve high temperature rutting resistance. The present invention provides a method for providing improved paving asphalt compositions by providing asphalts of increased useful temperature index (UTI) as a result of improving polymer efficiency.

In the process of the invention asphalt cements, e.g., petroleum bitumens, are heated to a temperature in the range of 200° F. to 500° F. (93° C. to 260° C.), preferably 300° F. to 400° F. (149° C. to 204° C.). In those embodiments employing the addition of other polymers in addition to ethylene-vinyl acetate copolymer, the other polymers are preferably added and dispersed in the asphalt prior to the addition of ethylene-vinyl acetate copolymer.

The ethylene-vinyl acetate copolymer added in amounts ranging from 0.1 wt. % to 10 wt. % of the asphalt cement (petroleum bitumen) component is dispersed in the asphalt using a high or low shear mixer. Mixing time is adjusted to ensure complete dispersion of the polymer. The mixer speed is reduced and the polyphosphoric acid (0.05 to 1.0 parts based on 100 parts of asphalt) is added. Mixing may be continued for 30 to 60 minutes. The asphalt is then kept at 300° F. to 400° F. (149° C. to 204° C.) for an additional 4 to 240 hours with or without stirring. Finally, the polymer modified asphalt is graded using the test procedures outlined in SHRP and adopted by American Association of State Highway and Transportation Officials, AASHTO, in their MP-1 Standard Test Method, "Superpave®/Performance Graded Asphalt Binder Specification and Testing," Superpave® Series No. 1 (SP-1), available from Asphalt Institute, Lexington, Ky. (1997). The specifications are also set out in U.S. Pat. No. 5,601,697 to Miller.

COMPARATIVE EXAMPLE 1

A sample of AC-20 was SHRP graded. The sample had an actual SHRP grade of 65.2–25.3 (UTI=90.5) and was rated as a PG64-22.

EXAMPLE 1

A mixture of the AC-20 of Comparative Example 1 and 3 wt. % Polybilt 152™ (EVA copolymer) available from Exxon Corporation was mixed at 330° F. (166° C.) for 30 minutes using a Ross high speed mixer available from Charles Ross & Son Co., Hauppage, N.Y., operating at 3000 rpm. The speed was reduced to 1000 rpm and 0.20 parts per hundred parts asphalt (pha) polyphosphoric acid obtained from Aldrich were added. Stirring was maintained for thirty minutes. Next, the mixture was placed in an oven set at 330° F. (166° C.) for 24 hours without stirring. This sample had an actual SHRP grade of 75.5-24.6 (UTI=100.1) and was rated as a PG70-22.

COMPARATIVE EXAMPLE 2

A sample of AC-20 was SHRP graded. The sample had an actual SHRP grade of 64.5-23.5 (UTI=88.0) and was rated as a PG64-22.

COMPARATIVE EXAMPLE 2A

A mixture of the AC-20 of Comparative Example 2 and 3 wt. % Polybilt 152™ (EVA copolymer) available from Exxon Corporation was mixed at 330° F. (166° C.) for 30 minutes using a Ross high speed mixer operating at 3000 rpm. The speed was reduced to 1000 rpm and stirring continued for thirty minutes. The mixture was placed in an oven set at 330° F. (166° C.) for 24 hours without stirring. This sample had an actual SHRP grade of 75.8-27.3 (UTI=103.1) and was rated as a PG70-22.

EXAMPLE 2

A mixture of the AC-20 of Comparative Example 2 and 3 wt. % Polybilt 152™ (EVA copolymer) available from Exxon Corporation was mixed at 330° F. (166° C.) for 30 minutes using a Ross high speed mixer operating at 3000 rpm. The speed was reduced to 1000 rpm and 0.20 pha (parts per hundred parts asphalt) polyphosphoric acid obtained from Aldrich were added. Stirring was maintained for thirty minutes. Next, the mixture was placed in an oven set at 330° F. (166° C.) for 24 hours without stirring. This sample had an actual SHRP grade of 79.2-26.1 (UTI=105.3) and was rated as a PG76-22.

Comparing Example 1 and 2 with Comparative Examples 1 and 2 shows that the process of this invention significantly improves the UTI of the asphalt cements and raises the high temperature performance grade by one or two grades. Furthermore, the results of Example 2 and Comparative Example 2A show that the process of the present invention improves the efficiency of the EVA copolymer allowing 3 wt. % EVA to give the higher PG76-22 grade of asphalt. Asphalt paving compositions of the present invention exhibit a distinct improvement in useful temperature index (UTI) as defined by the Superpave® Performance Graded (PG) Asphalt Binder Specifications, AASHTO MP 1.

MODIFICATIONS

Specific compositions, methods, or embodiments discussed are intended to be only illustrative of the invention disclosed by this specification. Variations on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference including any patents or other literature references cited within such documents.

What is claimed is:

1. A method for improving high temperature performance grade properties of unblown asphalt which comprises i) heating an asphalt cement to 200° F. to 500° F. (93° C. to 260° C.), ii) adding 0.1 wt. % to 10 wt. % ethylene-vinyl acetate copolymer based on weight of said asphalt cement, iii) adding a useful temperature index (UTI) improving amount of polyphosphoric acid, and iv) mixing the resulting blend, thereby providing an unblown asphalt having a greater useful temperature index (UTI) than a corresponding blend to which no polyphosphoric acid is added.

2. The method of claim 1 wherein said asphalt cement comprises at least 80 wt. % of said unblown asphalt and is selected from the group consisting of natural asphalts and synthetic asphalts, said ethylene-vinyl acetate copolymer is added in amounts ranging from 2 wt. % to 5 wt. %, said polyphosphoric acid is added in amounts ranging from 0.05 to 1.0 parts per hundred parts of asphalt cement.

3. The method of claim 1 wherein said asphalt cement comprises 90 wt. % to 98 wt. % of said unblown asphalt and is selected from the group consisting of natural asphalts and synthetic asphalts, said ethylene-vinyl acetate copolymer is added in amounts ranging from 2 wt. % to 5 wt. %, and said polyphosphoric acid is added in amounts ranging from 0.1 to 0.5 parts per hundred parts of asphalt cement.

4. The method of claim 1 wherein said asphalt cement is heated to 200° F. to 400° F. (93° C. to 204° C.), and said copolymer is added under conditions sufficient to disperse said copolymer.

5. The method of claim 4 further comprising v) maintaining the mixed blend of iv) at 200° F. to 400° F. (93° C. to 204° C.) for 4 to 240 hours.

6. The method of claim 1 further comprising adding to said asphalt cement 0.5 wt. % to 10 wt. % of a polymer selected from the group consisting of ethylene butylacrylate copolymer, ethylene butylacrylate glycidyl methacrylate copolymer, styrene-butadiene (SB) diblocks, styrene-isoprene-styrene (SIS) triblocks, and styrene-butadiene-styrene (SBS) triblocks, based on weight of said asphalt cement.

7. An unblown asphalt composition comprising a mixture containing a) at least 80 wt. % of asphalt cement, b) 0.1 wt. % to 10 wt. % ethylene-vinyl acetate copolymer, and c) polyphosphoric acid, added in an amount sufficient to improve useful temperature index (UTI) relative to a corresponding mixture free of said polyphosphoric acid.

8. The composition of claim 7 wherein said asphalt cement comprises at least 80 wt. % of said composition and is selected from the group consisting of natural asphalts and synthetic asphalts, said ethylene-vinyl acetate copolymer is added in amounts ranging from 2 wt. % to 5 wt. %, and said polyphosphoric acid is added in an amount ranging from 0.05 to 1.0 parts per hundred parts of asphalt cement.

9. The composition of claim 7 wherein said asphalt cement comprises 90 wt. % to 95 wt. % of said composition and is selected from the group consisting of natural asphalts and synthetic asphalts, said ethylene-vinyl acetate copolymer is added in amounts ranging from 3 wt. % to 5 wt. %, and said polyphosphoric acid is added in an amount ranging from 0.1 to 0.5 parts per hundred parts of asphalt cement.

10. The composition of claim 7 which further comprises 0.5 wt. % to 10 wt. % of a polymer selected from the group consisting of ethylene butylacrylate copolymer, ethylene butylacrylate glycidyl methacrylate copolymer, styrene-butadiene (SB) diblocks, styrene-isoprene-styrene (SIS) triblocks, and styrene-butadiene-styrene (SBS) triblocks, based on weight of said asphalt cement.

11. A method for improving the effectiveness of ethylene-vinyl acetate copolymer modifier in an unblown asphalt composition containing a) at least 80 wt. % asphalt cement and b) 1 wt. % to 10 wt. % ethylene-vinyl acetate copolymer which comprises adding to said composition a useful temperature index improving amount of polyphosphoric acid.

12. The method of claim 11 wherein said asphalt cement is a paving asphalt cement selected from the group consisting of natural asphalts and synthetic asphalts, said ethylene-vinyl acetate copolymer is present in amounts ranging from 2 wt. % to 5 wt. %, said polyphosphoric acid is added in amounts ranging from 0.05 to 1.0 parts per hundred parts of asphalt cement.

13. The method of claim 11 wherein said asphalt cement comprises 90 wt. % to 98 wt. % of said unblown asphalt and is selected from the group consisting of natural asphalts and synthetic asphalts, said ethylene-vinyl acetate copolymer is present in amounts ranging from 3 wt. % to 5 wt. %, and said polyphosphoric acid is added in amounts ranging from 0.1 to 0.5 parts per hundred parts of asphalt cement.

14. A pavement composition comprising an aggregate or aggregate material and from 1.0 wt. % to 10.0 wt. % of an unblown paving asphalt composition containing a) at least 80 wt. % of a paving asphalt cement, b) 0.1 wt. % to 10 wt. % ethylene-vinyl acetate copolymer, and c) polyphosphoric acid, added in an amount sufficient to improve useful temperature index (UTI) relative to a corresponding mixture free of said polyphosphoric acid.

15. The pavement composition of claim 14 wherein said unblown paving asphalt composition further comprises 0.5 wt. % to 10 wt. % of a polymer selected from the group consisting of ethylene butylacrylate copolymer, ethylene butylacrylate glycidyl methacrylate copolymer, styrene-butadiene (SB) diblocks, styrene-isoprene-styrene (SIS) triblocks, and styrene-butadiene-styrene (SBS) triblocks.

* * * * *